June 14, 1955    W. C. LUEBKING    2,710,935
MOTOR DRIVEN SHAFT POSITIONING SYSTEM
Filed June 22, 1951.    2 Sheets-Sheet 1

INVENTOR.
WALTER C. LUEBKING
BY
ATTORNEY

June 14, 1955  W. C. LUEBKING  2,710,935
MOTOR DRIVEN SHAFT POSITIONING SYSTEM
Filed June 22, 1951  2 Sheets-Sheet 2

INVENTOR.
WALTER C. LUEBKING
BY
*Marvin Moody*
ATTORNEY

United States Patent Office 2,710,935
Patented June 14, 1955

2,710,935

MOTOR DRIVEN SHAFT POSITIONING SYSTEM

Walter C. Luebking, Cedar Rapids, Iowa, assignor to Collins Radio Co., Cedar Rapids, Iowa, a corporation of Iowa Application June 22, 1951, Serial No. 233,038

5 Claims. (Cl. 318—372)

This invention relates in general to shaft positioning mechanism and in particular to apparatus which utilizes the reaction of a driving means for unlocking a toothed stop wheel.

In various fields of engineering it is oftentimes desirable to obtain an apparatus which can control a shaft position in fixed increments. For example, in the electronic art it is oftentimes desirable to tune a radio receiver to a number of predetermined frequencies such that upon rotation of a control knob a particular one of the pre-set frequencies will be automatically tuned. Various apparatus has been developed for this type of control and reference may be made to a patent issued to Richard W. May et al., No. 2,476,673 on July 19, 1949, for Shaft Positioning Control System. The shaft positioning mechanism, such as shown in this patent utilizes a pivoted pawl which engages a stop wheel. The pawl is actuated by an electronic means as, for example, a relay.

It is an object of this invention to provide an automatic shaft positioning mechanism which utilizes the reaction of the motor for controlling a stop pawl.

Another object of this invention is to provide a rotatably supported driving means which when energized will disengage a holding pawl.

Still another object of this invention is to provide a simplified shaft positioning mechanism which has a very simple control circuit.

A feature of this invention is found in the provision for a rotatably supported driving means mounted with some freedom and which has a cam extension for moving a holding pawl out of engagement with a stop wheel when the motor is energized so that the stop wheel may be freely rotated. When the driving means is de-energized, the pawl is allowed to drop into engagement with the stop wheel.

Further features, objects, and advantages of this invention will become apparent from the following description and claims when read in view of the drawings, in which:

Figure 2 is a sectional view taken on line 2—2 of Figure 1 with the motor energized;

Figure 3 is a sectional view taken on line 2—2 of Figure 1 with the motor de-energized; and, Figure 4 is a control circuit for the driving means of this invention.

Figure 1:
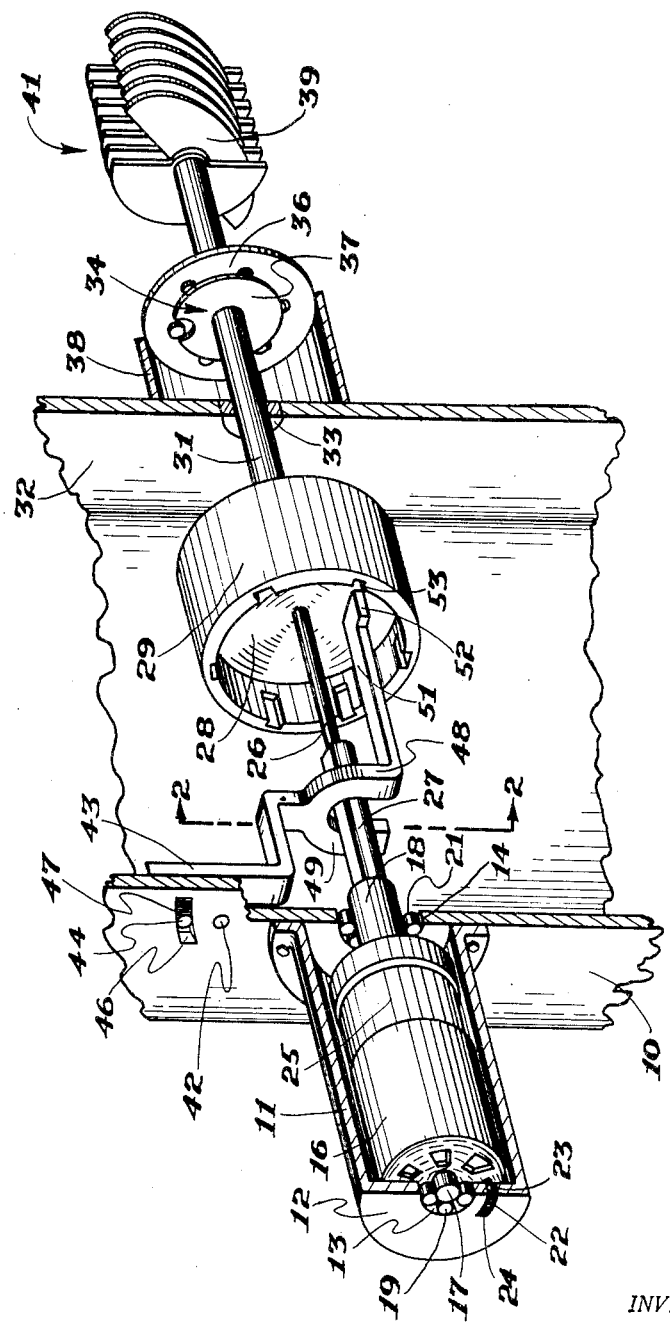
Figure 1 is a partly sectioned perspective view of the shaft control mechanism of this invention.

With reference to Figure 1, a supporting wall 10 has attached to one side thereof, by bolts or other suitable holding means, a cylindrical housing 11. The housing 11 has an end 12 formed with an opening 13 and the wall 10 is formed with an opening 14 in axial alignment with the opening 13.

A driving means 16, as for example, an electric motor, has cylindrical projections 17 and 18 extending from either end thereof which pass through the openings 13 and 14, respectively. Bearings 19 and 21, respectively, rotatably support the projections 17 and 18 in the housing 11 and wall 10.

A projection 22 extends from the motor 16 adjacent its outer periphery and is received in a slot 23 formed in the end 12. A spring 24 fits in slot 23 and urges the motor 16 in the same direction as the motor shaft turns.

The driving means 16 might be mounted to a suitable gear reduction 25 which reduces the speed of the motor to a more desirable one before supplying it to output shaft 26. Output shaft 26 of motor 16 passes through the projection 18 and through a cam shaft collar 27 which is rigidly attached to the motor 16 and the gear reduction 25. Shaft 26 passes through member 27 and rotates freely relative thereto.

Shaft 26 is connected to a clutch plate 28 and the other side of the clutch is mounted to a stop wheel 29 carried on a shaft 31. The clutch comprising the plate 28 and the stop wheel 29 may be of the conventional torque-limiting type.

The shaft 31 is rotatably supported in a wall 32 by means of bearings 33. A control switch, designated generally as 34, is mounted to the wall 32. A rotary portion 37 of the switch 34 is connected to the shaft 31. The shaft 31 connects to the rotor 39 of a tuning condenser 41, for example. It is to be understood, of course, that the shaft 31 might be used to position a gang switch, an inductance, or any other controlled shaft.

Mounted to the wall 10 by means of a shaft 42 is a pawl 43. A pin 44 extends transversely from the pawl 43 and is received in a slot 46 formed in the wall 10. A spring 47 biases the pawl 43 in a counterclockwise direction with respect to Figure 1. The pawl 43 is formed with a Y-shaped portion having the legs 48 and 49 which fit about the cam portion 27. The leg 48 has an extension 51 which terminates in a stop-wheel-engaging portion 52. The stop wheel 29 is formed with internal slots 53 in which the slot engaging portion 52 may be received.

With reference to Figure 2, the output shaft 26 of the motor 16 is shown passing through the cam shaft 27. Cam shaft 27 is formed with a projection 54 which rides between the legs 48 and 49 of the pawl 43. The spring 47 biases the leg 49 against the cam shaft 27 and when the motor is de-energized, the cam shaft 27 is in the position shown in Figure 3 due to the action of the spring 24 on the motor 16. This allows the slot-engaging portion 52 to be received in a slot to lock the stop wheel 29.

When the motor is energized the cam shaft 27 will turn so that the projection 54 pushes the leg 49, thus releasing the slot-engaging-portion 52 from the slot 53. It is well known that every action has an equal and opposite reaction, and the reaction of the motor against its support is used for camming the pawl 43 out of engagement with the stop wheel 29.

Once the pawl is released the stop wheel 29 is free to rotate and the shaft 26 will drive the shaft 31 through the clutch. However, until the pawl is released the shaft 31 can not be rotated and the clutch must slip until the pawl is released. The reaction of the motor against the pin 22 must be great enough to hold the cam shaft 27 in the position shown in Figure 2 as long as the motor is running. The instant the motor is disconnected from its power supply the reaction on the pin 22 will be opposite to the previous direction and the cam wheel will return to the position shown in Figure 3, thus allowing the pawl 43 to engage the slot next passing the slot-engaging portion 52. The inertia of the motor may cause it to coast after the pawl has engaged a slot, but the energy will be dissipated in the clutch and shaft 31 will be held by the pawl 43.

Figure 4 shows a motor control circuit that may be used to operate the mechanism of this invention. The controlled switch 34 has a movable disc 37 formed with cut-out portions 56 mounted on shaft 31. The stationary portion 36 of the switch has a plurality of electrical contacts 57, 58, 59, 61, 62 and 63. The disc 37 is made of conducting material and engages a portion of the contacts 57 through 63.

Disc 37 is electrically connected by lead 64 to one of the input terminals of motor 16. A controlling switch, designated generally as 66, comprises a stationary disc 67 which has a plurality of contacts 68, 69, 71, 72, 73 and 74 mounted about its periphery. A wiper contact 76 is mounted on the disc 67 and a controlled shaft 77 is connected to the control knob 78 for positioning the wiper contact 76.

Contacts 68 through 74 are each connected to a respective contact 57 through 63 on the control switch 34. The wiper contact 76 is connected to a lead 75 which goes to one terminal 81 of a suitable power supply. The other terminal 79 of the power supply is connected to the motor. The other side of the motor is connected to rotary portion 37 of switch 34. It is seen for each position of the wiper contact 76 there exists only one open circuit position for the rotor 37. This position occurs when the slot 56 brackets the contact (57—63) chosen by contact 76. Thus, by controlling the shaft 77 by the knob 78, the position of shaft 31 may be controlled.

In operation, the knob 78 may be turned to select a particular contact 68 through 74. If, for example, as shown in Figure 4, the wiper contact engages a contact 68 on the controlling switch which is electrically connected to contact 57 on the control switch, and such contact falls within the opening 56, the motor will not run and the shaft is set at the desired position. If the wiper contact is turned, for example, to engage contact 71 on the controlling switch, the motor circuit will be completed through leads 75, wiper contact 76, contact 71, contact 59 and the motor. The motor will run until the opening 56 brackets the contact 59.

It is to be understood, of course, that the electrical circuit may be such as described in the patent to Richard W. May et al., previously referenced, which utilizes a wire saving scheme so that four wires may control fifteen positions of a shaft rather than merely a number of positions equal to the number of wires.

It is seen that this invention makes use of the reaction of the motor against its housing to release and engage a stop-pawl with a stop wheel. Such a mechanism eliminates electrical means for releasing the stop pawl and greatly simplifies the controlling circuit.

Although this invention has been described with respect to particular embodiments thereof, it is not to be so limited as changes and modifications may be made therein which are within the full intended scope of the invention as defined by the appended claims.

I claim:

1. A stop mechanism for controlling the position of a shaft comprising, a reference plate, a hollow housing attached to said reference plate, a motor with a rotor and a stator, the stator of said motor rotatably supported by said housing for limited motion relative thereto, the shaft attached to the rotor of said motor, a cam attached to the stator of said motor, a stop-wheel with internal teeth mounted on the shaft, a pawl pivotally supported by the reference plate and engageable with said stop-wheel and said cam engageable with said pawl to cam it out of engagement with said stop-wheel when the motor is energized.

2. A stop mechanism for controlling the position of a shaft comprising, a reference plate, a hollow housing attached to said reference plate, a motor with a rotor and a stator, the stator of said motor rotatably supported by said housing for limited motion relative thereto, the shaft attached to the rotor of said motor, a cam attached to the stator of said motor, a stop-wheel with internal teeth mounted on the shaft, a pawl pivotally supported by the reference plate and engageable with said stop-wheel when the motor is energized, said cam engageable with said pawl to cam it out of engagement with the stop-wheel when the motor is energized, and a controlled element attached to said shaft.

3. A stop mechanism for controlling the position of a shaft comprising, a reference plate, a hollow housing attached to the reference plate, a motor with a rotor and a stator, the stator of said motor rotatably supported by said housing for limited motion relative thereto, the shaft attached to the rotor of said motor, a cam attached to the stator of said motor, a stop-wheel with internal teeth mounted on the shaft, a pawl pivotally supported by the reference plate and engageable with said stop-wheel, an engaging portion formed on said pawl, the engaging portion of the pawl in contact with the cam so as to cam it out of engagement with said stop-wheel when the motor is energized.

4. A stop mechanism comprising a shaft, a first reference plate rotatably supporting said shaft, a second reference plate mounted adjacent said first reference plate, a motor with a stator and a rotor, the stator of said motor rotatably supported by the second reference plate, means for limiting the angular motion of said stator relative to the second reference plate, a cam attached to said stator, the rotor of said motor connected to the shaft, a pawl pivotally supported by said second reference plate and engageable with said cam, a stop-wheel mounted on the control shaft and engageable with said pawl, and a control element attached to said shaft.

5. A stop mechanism comprising a shaft, a first reference plate rotatably supporting said shaft, a second reference plate mounted adjacent said first reference plate, a motor with a stator and a rotor, the stator of said motor rotatably supported by the second reference plate, means for limiting the angular motion of said stator relative to the second reference plate comprising a pin on the stator which is received in a slot on the second reference plate, the rotor of said motor connected to the shaft, a pawl pivotally supported by said second reference plate and engageable with said cam, a stop-wheel engageable with said pawl and supported on said control shaft, and a control element attached to said shaft.

References Cited in the file of this patent

UNITED STATES PATENTS

| Re. 22,324 | Newman | May 25, 1943 |
| 2,085,442 | Newell | June 29, 1937 |
| 2,267,135 | Roberts | Dec. 23, 1941 |
| 2,553,951 | Stumper | May 22, 1951 |
| 2,574,603 | Uhling | Nov. 13, 1951 |

FOREIGN PATENTS

| 453,892 | Germany | June 6, 1926 |